(12) United States Patent
Holme et al.

(10) Patent No.: US 8,940,446 B1
(45) Date of Patent: Jan. 27, 2015

(54) SOLID STATE LITHIUM-AIR BASED BATTERY CELL

(71) Applicant: QuantumScape Corporation, San Jose, CA (US)

(72) Inventors: Tim Holme, Mountain View, CA (US); Niall Donnelly, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

(21) Appl. No.: 13/959,750

(22) Filed: Aug. 6, 2013

(51) Int. Cl.
H01M 8/22 (2006.01)
H01M 12/02 (2006.01)

(52) U.S. Cl.
CPC ................... *H01M 12/02* (2013.01)
USPC ............ 429/405; 429/403; 429/322; 429/535

(58) Field of Classification Search
CPC ....................................................... H01M 12/06
USPC ................................. 429/403, 405, 322, 535
See application file for complete search history.

(56) References Cited

U.S. PATENT DOCUMENTS

| | | | |
|---|---|---|---|
| 2009/0317724 A1* | 12/2009 | Kumar et al. | 429/320 |
| 2011/0053002 A1* | 3/2011 | Yamamura et al. | 429/322 |
| 2011/0244337 A1* | 10/2011 | Ohta et al. | 429/319 |
| 2013/0122380 A1 | 5/2013 | Visco et al. | |

FOREIGN PATENT DOCUMENTS

| | | |
|---|---|---|
| WO | 2011038773 A1 | 4/2011 |
| WO | 2012114175 A1 | 8/2012 |

OTHER PUBLICATIONS

"Low temperature synthesis of highly ion conductive Li7La3Zr2O12—Li3BO3 composites", by Kiyoharu Tadanaga, Ryohei Takano, Takahiro Ichinose, Shigeo Mori, Akitoshi Hayashi, Masahiro Tatsumisago, issued on "Electrochemistry Communications 33 (2013) 51-54".

"Al-doped Li7La3Zr2O12 synthesized by a polymerized complex method", by Ying Jin, Paul J. McGinn, issued on "Journal of Power Sources 196 (2011) 8683-8687".

(Continued)

*Primary Examiner* — Patrick Ryan
*Assistant Examiner* — Alex Usyatinsky
(74) *Attorney, Agent, or Firm* — Kilpatrick Townsend & Stockton LLP (57) ABSTRACT

In an example, the present invention provides a solid state battery device, e.g., battery cell or device. The device has a current collector region and a lithium containing anode member overlying the current collector region. The device has a thickness of electrolyte material comprising a first garnet material overlying the lithium containing anode member. The thickness of electrolyte material has a density ranging from about 80 percent to 100 percent and a porous cathode material comprising a second garnet material overlying the thickness of electrolyte material. The porous cathode material has a porosity of greater than about 30 percent and less than about 95 percent and a carbon bearing material overlying a surface region of the porous cathode material. In an example, the carbon bearing material comprises substantially carbon material, although there can be variations.

11 Claims, 12 Drawing Sheets

(56) References Cited

OTHER PUBLICATIONS

"Mechanosynthesis of Solid Electrolytes: Preparation, Characterization, and Li Ion Transport Properties of Garnet-Type Al-Doped Li7La3Zr2O12 Crystallizing with Cubic Symmetry", by Andre Düvel, Alexander Kuhn, Lars Robben, Martin Wilkening, and Paul Heitjans, issued on "J. Phys. Chem. C 2012, 116, 115192-15202".

"Low-temperature synthesis of Li7La3Zr2O12 with cubic garnet-type structure", by Hui Xie, Yutao Li, John B. Goodenough, issued on "Materials Research Bulletin 47 (2012) 1229-1232".

"Experimental visualization of lithium conduction pathways in garnet-type Li7La3Zr2O12", by Jiantao Han, Jinlong Zhu, Yutao Li, Xiaohui Yu, Shanmin Wang, Gang Wu,a Hui Xie, Sven C. Vogel, Fujio Izumi, Koichi Momma, Yukihiko Kawamura, Yunhui Huang, John B. Goodenoughb and Yusheng Zhao, issued on "Chem. Commun., 2012, 48, 9840-9842".

"On the Mechanism of Nonaqueous Li-O2 Electrochemistry on C and Its Kinetic Overpotentials: Some Implications for Li-Air Batteries", by Bryan. D. McCloskey, Rouven Scheffler, Angela Speidel, Girish Girishkumar, and Alan. C. Luntz, issued on "J. Phys. Chem. C XXXX, XXX, XXX-XXX".

"Fabrication of all-solid-state lithium battery with lithium metal anode using Al2O3-added Li7La3Zr2O12 solid electrolyte", by Masashi Kotobuki, Kiyoshi Kanamura, Yosuke Sato, Toshihiro Yoshida, issued on "Journal of Power Sources 196 (2011) 7750-7754".

"Structure and dynamics of the fast lithium ion conductor "Li7La3Zr2O12"", by Henrik Buschmann, Janis Do Ile, Stefan Berendts, Alexander Kuhn, Patrick Bottke, Martin Wilkening, Paul Heitjans, Anatoliy Senyshyn, Helmut Ehrenberg, Andriy Lotnyk, Viola Duppel, Lorenz Kienlee and Jurgen Janek, issued on "Phys. Chem. Chem. Phys., 2011, 13, 19378-19392".

"A Reversible and Higher-Rate Li-O2 Battery", by Zhangquan Peng, Stefan A. Freunberger, Yuhui Chen, Peter G. Bruce, issued on "http://www.sciencemag.org/content/early/recent / 19 July 2012 / Page 1 / 10.1126/science.1223985".

"Environmentally Friendly Flux Growth of High-Quality, Idiomorphic Li5La3Nb2O12 Crystals", by Yusuke Mizuno, Hajime Wagata, Hitoshi Onodera, Kunio Yubuta, Toetsu Shishido, Shuji Oishi, and Katsuya Teshima, issued on "Cryst. Growth Des., Just Accepted Manuscript • DOI: 10.1021/cg3012348".

"Li6ALa2Nb2O12 (A5Ca, Sr, Ba): A New Class of Fast Lithium Ion Conductors with Garnet-Like Structure", by Venkataraman Thangadurai and Werner Weppner, issued on "J. Am. Ceram. Soc., 88 [2] 411-418 (2005)".

"High lithium ionic conductivity in the garnet-type oxide Li7-X La3(Zr2-X, NbX)O12 (X = 0-2)", by Shingo Ohta, Tetsuro Kobayashi, Takahiko Asaoka, issued on "Journal of Power Sources 196 (2011) 3342-3345".

"Optimizing Li+ conductivity in a garnet framework", by Yutao Li,ab Jian-Tao Han, Chang-An Wang, Hui Xieb and John B. Goodenough, issued on "J. Mater. Chem., 2012, 22, 15357".

"Schnelle Lithiumionenleitung in granatartigem Li7La3Zr2O12", by Ramaswamy Murugan, Venkataraman Thangadurai and Werner Weppner, issued on "Angew. Chem. 2007, 119, 7925-7928".

"Fast Lithium Ion Conduction in Garnet-Type Li7La3Zr2O12", by Ramaswamy Murugan, Venkataraman Thangadurai, and Werner Weppner, issued on "Angew. Chem. Int. Ed. 2007, 46, 7778-7781".

"Crystal Chemistry and Stability of "Li7La3Zr2O12" Garnet: A Fast Lithium-Ion Conductor", by Charles A. Geiger, Evgeny Alekseev, Biljana Lazic, Martin Fisch, Thomas Armbruster, Ramona Langner, Michael Fechtelkord, Namjun Kim, Thomas Pettke, and Werner Weppner, issued on "Inorg. Chem. 2011, 50, 1089-1097".

"Lithium Distribution in Aluminum-Free Cubic Li7La3Zr2O12", by Hui Xie, Jose A. Alonso, Yutao Li, Maria T. Fernandez-Diaz, and John B. Goodenough, issued on "Chem. Mater. 2011, 23, 3587-3589".

"Density Functional Investigation of the Thermodynamic Stability of Lithium Oxide Bulk Crystalline Structures as a Function of Oxygen Pressure", by Kah Chun Lau and Larry A. Curtiss, issued on "J. Phys. Chem. C XXXX, XXX, 000-000".

"Li—O2 and Li—S batteries with high energy storage", by Peter G. Bruce, Stefan A. Freunberger, Laurence J. Hardwick and Jean-Marie Tarascon, issued on "Nature Materials | vol. 11 | Jan. 2012".

"Structure and Li+ dynamics of Sb-doped Li7La3Zr2O12 fast lithium ion conductors", by S. Ramakumar, L. Satyanarayana, Sunkara V. Manorama and Ramaswamy Murugan, issued on "Phys. Chem. Chem. Phys., 2013, 15, 11327".

"Effect of substitution (Ta, Al, Ga) on the conductivity of Li7La3Zr2O12", by J.L. Allena, J. Wolfenstine, E. Rangasamy, J. Sakamoto, issued on "Journal of Power Sources 206 (2012) 315-319".

"Electrochemical performance of an all-solid-state lithium ion battery with garnet-type oxide electrolyte", by Shingo Ohta, Tetsuro Kobayashi, Juntaro Seki, Takahiko Asaoka, issued on "Journal of Power Sources 202 (2012) 332-335".

* cited by examiner

SOLID STATE LITHIUM-AIR BASED BATTERY CELL

BACKGROUND OF INVENTION

The present invention relates generally to energy storage techniques. In particular, the present invention provides techniques for manufacturing a lithium-air based battery cell and related device. Merely by way of example, the invention has been applied to solid-state battery cells, although there can be other applications.

An explosion in the development of electronic and communication devices has occurred, and continues at a rapid pace. As an example, such apparatus include, among others, a personal computer, a video camera and a portable telephone, commonly termed a "smart phone." Examples of popular smart phones include the iPhone™ from Apple Inc. of Cupertino, Calif. or those phones using the Android™ operating system of Google Inc. in Mountain View, Calif. Other popular apparatus include electric or hybrid automobiles such as those from Tesla Motors Inc. in Fremont, Calif. or the Prius manufactured by Toyota Motor Corporation. Although highly successful, these popular apparatus are limited by storage capacity and in particular battery capacity. That is, a high-output and high-capacity battery for an electric automobile or a hybrid automobile has been advanced in the automobile industry. A lithium battery has been presently noticed from the viewpoint of a high energy density among various kinds of batteries.

Liquid electrolyte containing a flammable organic solvent has been used for conventional lithium batteries. Unfortunately, safety events can occur due to gassing, overcharge, overdischarge, short circuit, or overtemperature conditions despite the presence of engineered safety devices such as current interrupt devices and vents. A lithium battery configured with a solid electrolyte layer (replacing the liquid electrolyte) has been described to improve the safety of the battery. A garnet electrolyte material has been proposed as a solid electrolyte material used in conventional lithium ion batteries. To increase energy density of batteries to a level necessary for widespread adoption of electric vehicles, the use of a lithium-air based battery cell has been proposed. Such a lithium-air battery cell has shortcomings including formation of lithium dendrites, decomposition of electrolyte material, and utilization of a carbon based cathode, which catalyzes the decomposition of carbonate electrolyte materials. Further details of the shortcomings of the conventional lithium-air battery cell are described throughout the present specification and more particularly below.

Techniques for improving a lithium air battery and implementing a solid-state battery are highly desired.

SUMMARY OF INVENTION

According to the present invention, techniques related generally to energy storage are provided. In particular, the present invention provides techniques for manufacturing a lithium-air based battery cell and related device. Merely by way of example, the invention has been applied to solid-state battery cells, although there can be other applications.

In an example, lithium air batteries have potentially high energy density. However, practically such lithium air batteries suffer from low reversibility and low power density due to a challenge of decomposition of traditional electrolytes at the cathode due to the presence of oxygen, catalytic carbon cathodes, and the electrochemical voltage at the cathode. Further, to enable high energy density in a relatively high-capacity, low-voltage cathode, the anode should be low voltage and high capacity. A lithium metal anode is often desirable, although it generally requires a solid-state electrolyte to avoid dendrite formation from plating lithium metal during charge.

In an example, the present specification discloses a solid state electrolyte to enable a lithium metal anode plus a solid state catholyte with high conductivity to avoid the problems of decomposition with conventional liquid catholytes. The catholyte—which should be stable at >3V versus Li, highly conductive, and stable to air—is preferably an oxide material such as a garnet ($La_3Li_7Zr_2O_{12}$ and variants thereof) and may be coated with a conductive carbon via a vapor-phase or liquid-phase coating for electron conductivity. Such a structure provides a high surface-area to provide a high density of reaction sites. To summarize, an all solid-state system would enable high energy density, high power density, and reversibility of a lithium-air battery in an example.

Electric vehicles often desire batteries with high energy density, high power density, long lifetime, good safety, and low cost. Lithium-air batteries have been considered the "holy grail" of electrical energy storage due to their high theoretical energy density. This disclosure includes a technique to enables lithium air batteries in practical systems by overcoming their traditional shortfalls such as low cycle life due to cathode-catalyzed decomposition of the electrolyte, low power density due to the poisoning of the cathode by those decomposition products, and other limitations. Further, this specification discloses a cathode that is stable to air—oxygen as well as the $CO_2$ and $H_2O$ in the air—addressing the potential system-level complexity required to separate $O_2$ from air in a liquid electrolyte battery. Additional cost, weight, volume, and complexity is otherwise required to scrub $CO_2$ and $H_2O$ from the air before introduction to the cathode of a Li-air battery. Finally, the solid-state electrolyte also enables a lithium metal anode, a desirable solution for high energy density in a Li-air battery. As used herein, the term high energy density generally means 250 to 800 Wh/kg at the packaged cell level, although there can be variations.

In an example, the present invention provides a solid state battery device, e.g., battery cell or device. The device has a negative current collector region and a lithium containing anode member overlying the negative current collector region. The device has a thickness of electrolyte material comprising a first garnet material overlying the lithium containing anode member. The thickness of electrolyte material has a density ranging from about 80 percent to 100 percent and a porous catholyte material comprising a second garnet material overlying the thickness of electrolyte material. The porous catholyte material has a porosity of greater than about 30 percent and less than about 95 percent and a carbon bearing material overlying a surface region of the porous cathode material. In an example, the carbon bearing material comprises substantially carbon material, although there can be variations. The device optionally has a positive current collector grid overlying the carbon material and making contact to the carbon material.

In an example, the present invention provides an electrochemical cell device. The device has a negative current collector member and a lithium metal anode structure electrically coupled with the negative current collector member. The device has a solid oxide bearing lithium ion conducting electrolyte separator in contact with the lithium metal anode structure. In an example, the solid oxide bearing lithium ion conducting electrolyte separator has a density ranging from about 80% to about 100%. The device a solid oxide bearing lithium ion conducting cathode scaffold structure overlying the solid oxide bearing lithium ion conducting electrolyte separator and an electronically conductive coating covering at least one portion of the cathode scaffold structure. As used herein, the term "scaffold structure" generally means a porous, mechanically stable supporting structure, although there may be variations. The device has a positive current collector in electrical contact with the electrically conductive coating and a housing structure (e.g., a metal that does not oxidize such as a coated Al mesh, a Ni mesh or foam, a stainless steel mesh, etc.) configured with the negative current collector member, the lithium metal anode structure, the solid oxide bearing lithium ion conducting electrolyte separator, the solid oxide bearing lithium ion conducting cathode scaffold structure, the electronically conductive coating, and the positive current collector.

In an example, the present invention provides a method for manufacturing a electrochemical cell. The method includes providing a negative current collector member and forming a lithium metal anode structure electrically coupled with the negative current collector member. The method includes forming a solid oxide bearing lithium ion conducting electrolyte separator in contact with the lithium metal anode structure. In an example, the solid oxide bearing lithium ion conducting electrolyte separator has a density ranging from about 80% to about 100%. The method includes forming a solid oxide bearing lithium ion conducting cathode scaffold structure overlying the solid oxide bearing lithium ion conducting electrolyte separator, the solid oxide bearing lithium ion conducting cathode scaffold structure having an electronically conductive coating covering at least one portion of the cathode scaffold structure. The method also includes forming a positive current collector in electrical contact with the electrically conductive coating.

In an example, the present solid oxide electrolyte (lithium conductor which is still an oxide) has one or more of the following benefits:

No lithium dendrite formation;
No electrolyte decomposition; and
High conductivity and thermal stability.

Further details of the present benefits can be found throughout the present specification and more particularly below.

The present invention achieves these benefits and others in the context of known process technology. However, a further understanding of the nature and advantages of the present invention may be realized by reference to the latter portions of the specification and attached drawings.

DESCRIPTION OF THE SPECIFIC EMBODIMENTS

According to the present invention, techniques related generally to energy storage are provided. In particular, the present invention provides techniques for manufacturing a lithium-air based battery cell and related device. Merely by way of example, the invention has been applied to solid-state battery cells, although there can be other applications.

As background, one or more of the following limitations are overcome by the present method and structures.

A cathode is often made of gold or carbon. Gold is too expensive and too heavy for practical use. Carbon catalyzes decomposition of the electrolyte.

An anode made of lithium has limitations, that is, no good solution exists for Li-metal anodes. The second best system includes Si-alloying anodes, which introduce a voltage, volume and mass penalty compared to a lithium metal anode.

An electrolyte is often made of conventional carbonates, which are unstable in electrochemical evolution of $O_2$ from $Li_2O_2$. In an example is a recharge reaction in a Li-air battery.

Depending upon the embodiment, one or more of these limitations are overcome by the present techniques.

Figure 1:
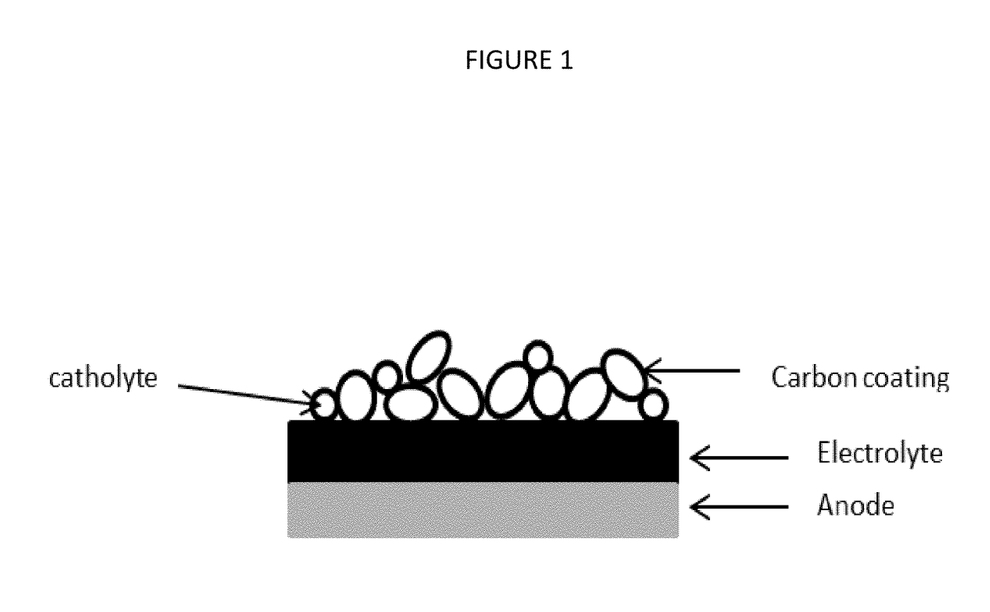
FIG. 1 is a simplified cross-sectional view of an electrochemical cell according to an example of the present invention.

FIG. 1 is a simplified cross-sectional view of an electrochemical cell according to an example of the present invention. As shown, the cell has a current collector region (not shown) and a lithium containing anode member overlying the current collector region. The device has a thickness of electrolyte material comprising a first garnet material overlying the lithium containing anode member. In an example, the thickness of electrolyte material has a density ranging from about 80 percent to 100 percent, although there can be variations. In an example, the cell has a plurality of catholyte particles configured as a porous cathode material comprising a second garnet material overlying the thickness of electrolyte material. In an example, the porous electrolyte material has a porosity of greater than about 30 percent and less than about 95 percent and a carbon bearing material overlying a surface region of the porous cathode material. In an example, the carbon bearing material comprises substantially carbon material, although there can be variations.

Figure 2:
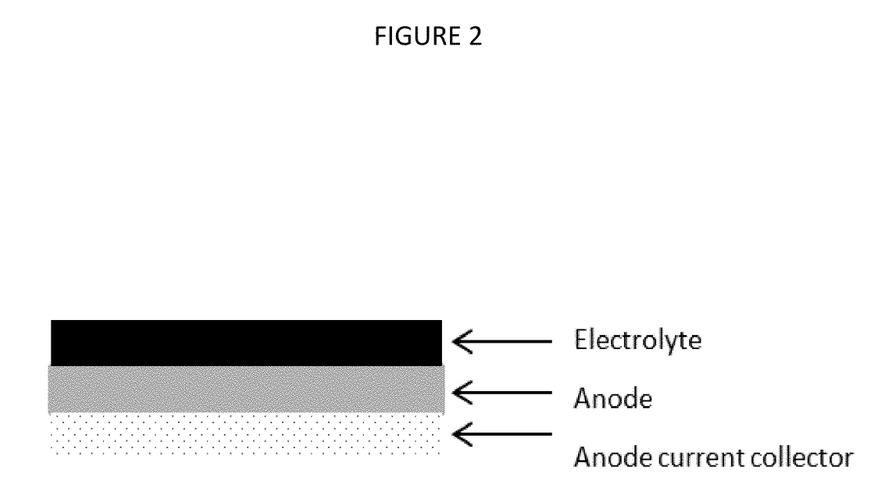
FIG. 2 is a simplified cross-sectional diagram of a lithium containing anode member overlying the current collector region and a thickness of electrolyte material comprising a first garnet material overlying the lithium containing anode member according to an example of the present invention.

FIG. 2 is a simplified cross-sectional diagram of a lithium containing anode member overlying the current collector region and a thickness of electrolyte material comprising a first garnet material overlying the lithium containing anode member according to an example of the present invention. In an example, the anode current collector is made of a suitable material such as stainless steel, copper, or nickel, although there can be variations. The anode is made of lithium metal. Overlying the anode material is the thickness of electrolyte material.

Figure 3:
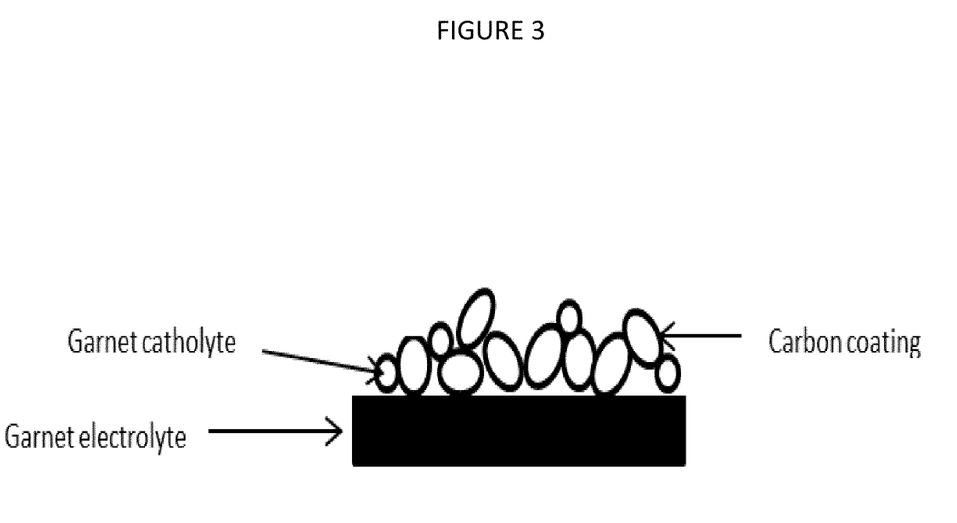
FIG. 3 is a more detailed diagram of a porous cathode material comprising a second garnet material and a carbon coating overlying the cathode material, the cathode material overlying the thickness of electrolyte material according to an example of the present invention.

FIG. 3 is a more detailed diagram of a porous cathode material comprising a second garnet material and a carbon coating overlying the cathode material, the cathode material overlying the thickness of electrolyte material according to an example of the present invention. As shown is a garnet electrolyte made of a La3Li7Zr2O12. The cathode material comprises a plurality of garnet catholyte particles each of which has an overlying carbon bearing material.

Figure 4:
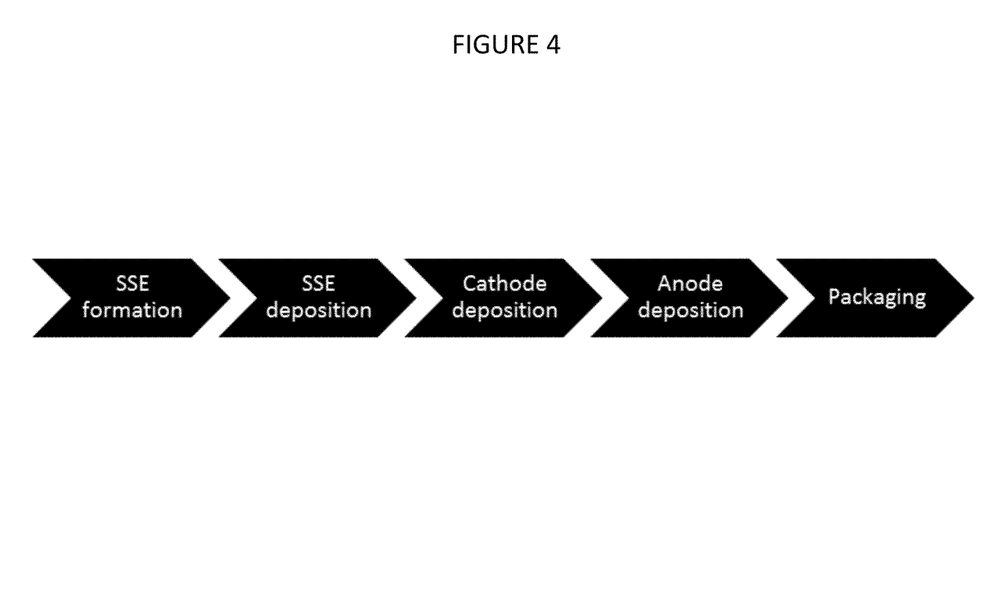
FIG. 4 is a simplified flow diagram illustrating a method of fabricating an electrochemical cell according to an example of the present invention.

FIG. 4 is a simplified flow diagram illustrating a method of fabricating an electrochemical cell according to an example of the present invention. In an example, the method comprises a sequence of steps including a solid state electrolyte (SSE) formation, SSE deposition, cathode deposition, anode deposition, and packaging. Further details of the present method can be found throughout the present specification and more particularly below.

Figure 5:
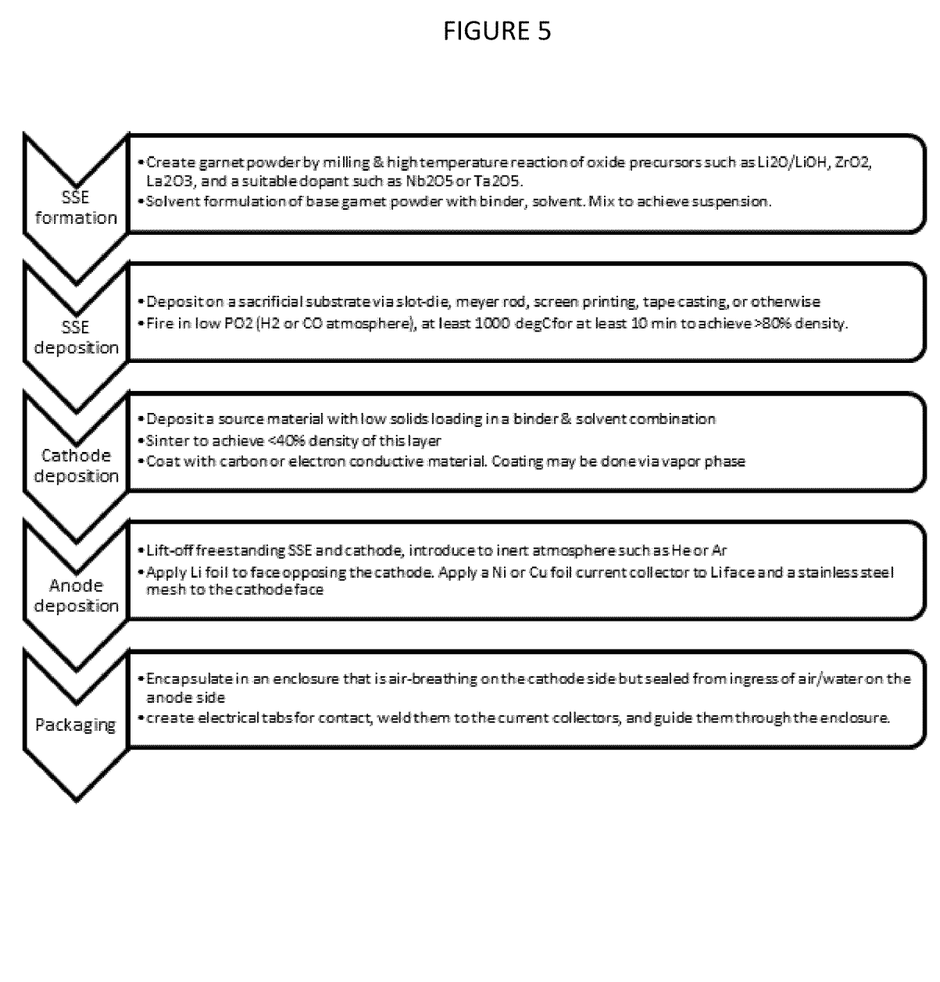
FIG. 5 is a more detailed flow diagram illustrating a method of fabricating an electrochemical cell according to an example of the present invention.

FIG. 5 is a more detailed flow diagram illustrating a method of fabricating an electrochemical cell according to an example of the present invention. In an example, the method begins with SSC formation. That is, the method creates a garnet powder by milling and high temperature reaction of oxide precursors such as $Li_2O/LiOH$, $ZrO_2$, $La_2O_3$ in an example. In an example, the powder also has a suitable dopant such as Al2O3, Sb2O3, $Nb_2O_5$ or $Ta_2O_5$, among others. The method also includes solvent formulation of base garnet powder with binder, solvent and subsequent mixing to achieve a suspension.

In an example, the method includes solid state electrolyte (SSE) deposition, that is, the method deposits a slurry containing garnet powder on a sacrificial substrate via slot-die, meyer rod, screen printing, tape casting, or the like, and combinations thereof. In an example, the method includes subjecting the deposited material to a thermal treatment or "firing", optionally in a low $PO_2$ environment (atmosphere partially containing $H_2$ or CO), at least 1000° C. for at least 10 min or other suitable time to achieve greater than 80% density up to about 100%. Of course, there can be variations including hot pressing, or hot isostatic pressing of the garnet.

The method includes cathode deposition. In particular, the method includes a step to deposit a source material with low solids loading in a binder and solvent combination. The method also sinters the deposited source material to achieve greater than 30% porosity or less than 95% porosity of the material. In an example, the method also coats the sintered source material to a carbon or electron conductive material, such as a carbon or the like. Carbon coating methods are well known in the art; in an example, the coating occurs via vapor deposition, plasma deposition, pitch coating, thermal decomposition coating with precursors comprising sucrose, poly (ethylene glycol), citric acid, poly(vinyl alcohol), ascorbic acid, etc, sputtering, or other techniques.

In an example, the method then includes anode formation. In an example, the method "lifts off" the SSE to be a freestanding SSE and cathode. The method introduces the freestanding SSE and cathode to inert atmosphere such as He or Ar or other suitable species. The method applies a lithium foil to a face opposing the cathode. Application can be via vapor phase deposition such as thermal evaporation, e-beam evaporation, flash evaporation or sputtering or by mechanical application of a lithium foil. In an example, the method applies a Ni or Cu foil current collector to the face and a stainless steel mesh to the cathode face to form a multilayered stacked structure.

In an example, the method includes a packaging process. That is, the method encapsulates the stacked structure in an enclosure that is air-breathing on the cathode side but sealed from ingress of air/water on the anode side. In an example, the method creates electrical tabs for contact, weld them to the current collectors, and guide them through the enclosure. Further details of the present technique can be found throughout the present specification and more particularly below.

Figure 6:
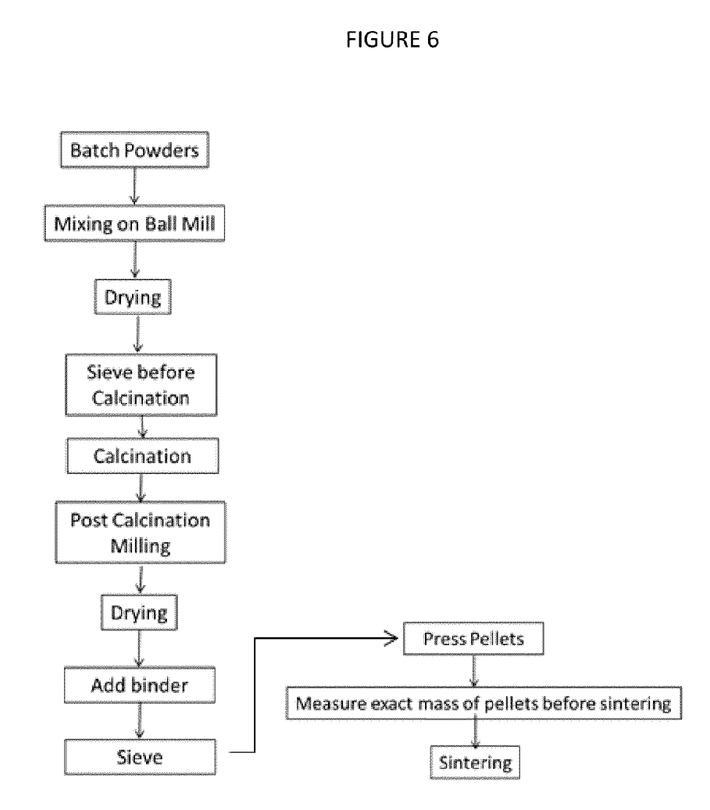
FIG. 6 shows a sequence of processes for fabricating a dense garnet pellet according to an example of the present invention.
Figure 7:
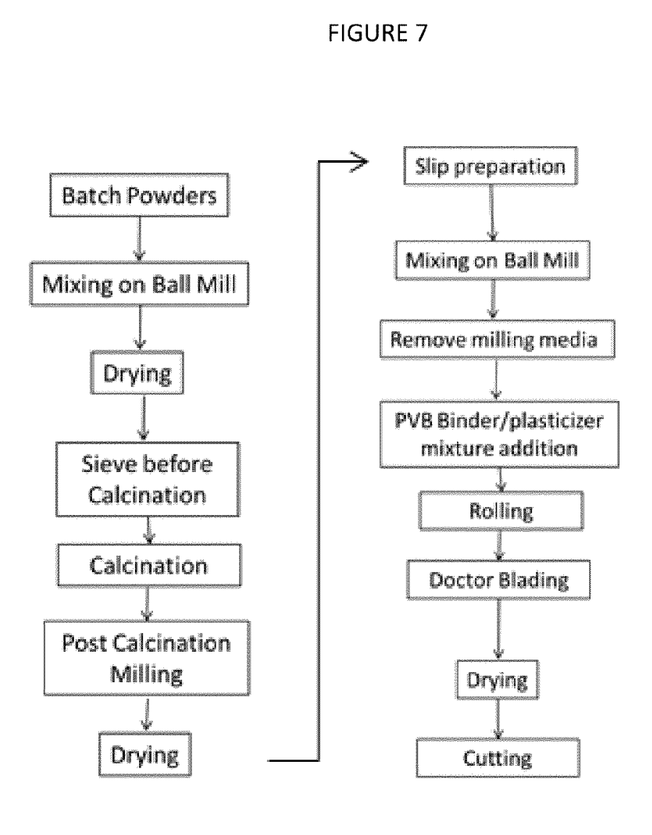
FIG. 7 shows a sequence of processes for fabricating a porous garnet film according to an example of the present invention.

FIG. 6 shows a sequence of processes for fabricating a dense garnet pellet according to an example of the present invention; and FIG. 7 shows a sequence of processes for fabricating a porous garnet film according to an example of the present invention. Further details of the process sequence can be found throughout the present specification, and more particularly below.

Figure 8:
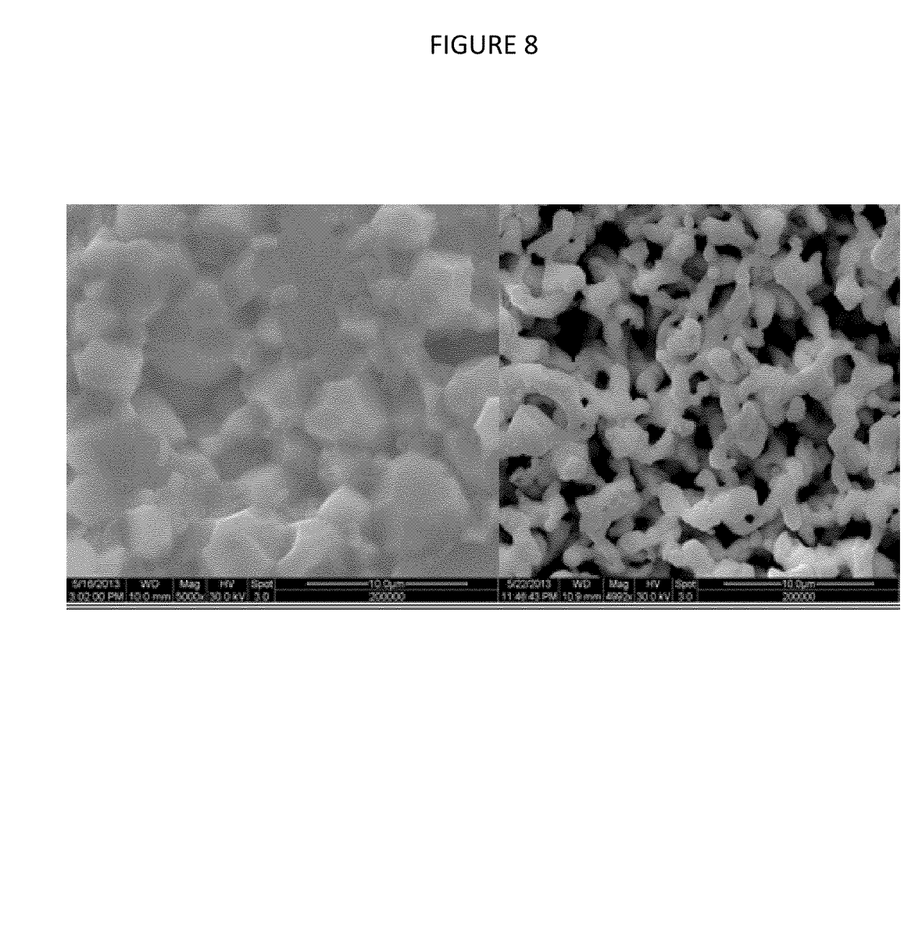
FIG. 8 presents SEM micrographs of dense garnet film and a porous garnet film according to examples of the present invention.

FIG. 8 presents SEM micrographs of dense garnet film and a porous garnet film according to examples of the present invention. As shown, the micrograph in FIG. 8(b) illustrates a percolating structure, which is interconnected to form a porous garnet film. The percolating structure is interconnected with each other, and includes various necking structures.

Figure 9:
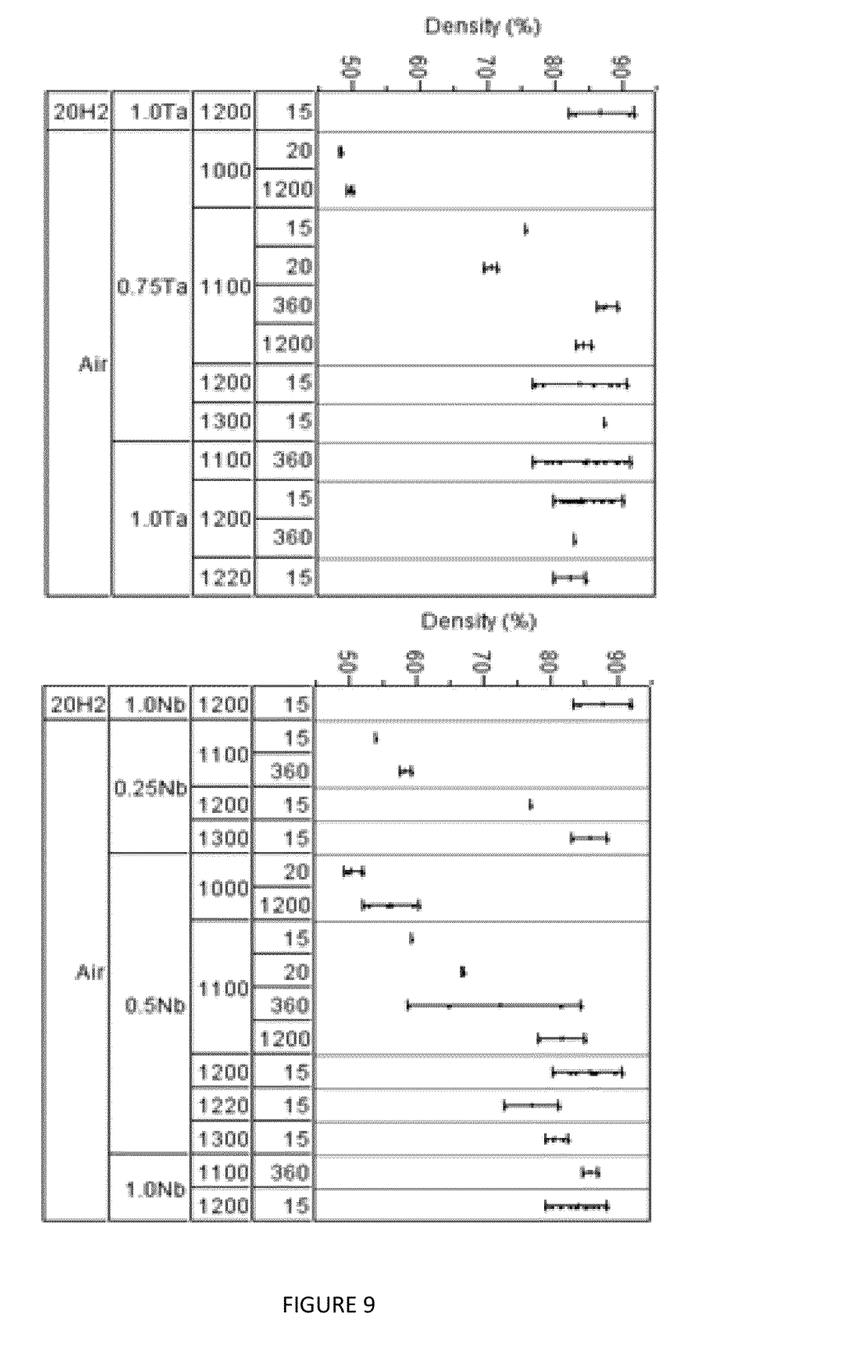
FIG. 9 presents density of dense garnet formulations with Nb and Ta doping in an example.

FIG. 9 presents density of dense garnet formulations with Nb and Ta doping. As shown is density plotted against formulations of Nb and Ta doping and annealing time, temperature, and atmosphere.

Figure 10:
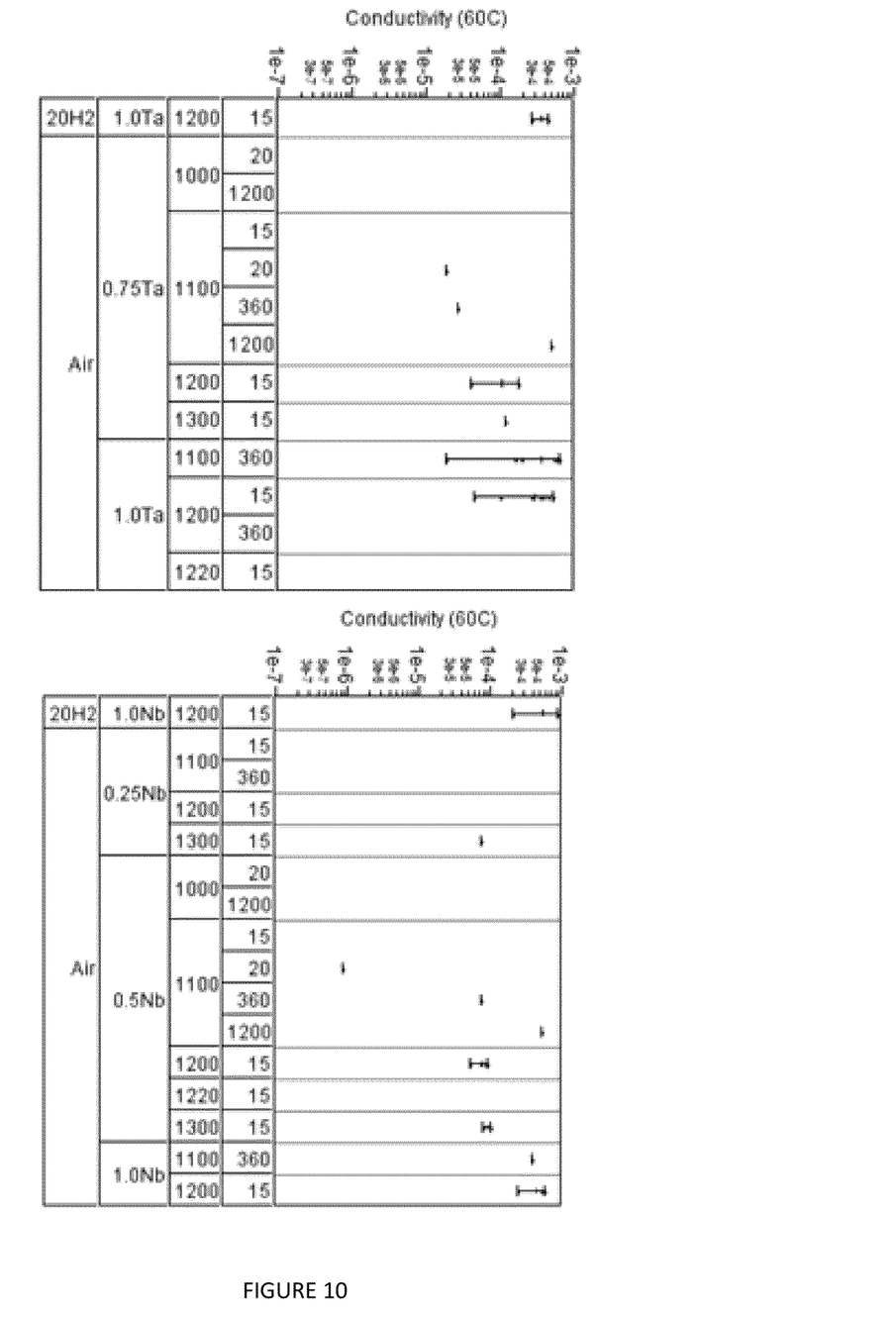
FIG. 10 presents conductivity of dense garnet formulations with Nb and Ta doping in an example.

FIG. 10 presents conductivity of dense garnet formulations with Nb and Ta doping. As shown is conductivity plotted against formulations of Nb and Ta doping and annealing time, temperature, and atmosphere.

In an example, the lithium-air battery is constructed according to the following description. Lithium metal anode, garnet solid state electrolyte, porous garnet catholyte, cathode is made by carbon deposition on the high surface area of the garnet catholyte, and a metal mesh current collector is applied to leave the cathode open to air. The garnet is undoped or a Sb—, Nb—, Ta—, Al—, or otherwise doped version of $La_3Li_7Zr_2O_{12}$ material with high conductivity. The electrolyte is made as a thin, freestanding film on a sacrificial substrate such as polypropylene, mica, polyethylene, or polyimide or other suitable material, including combinations and the like. The electrolyte is deposited (by tape-casting, screen printing, slot-die, meyer rod, or otherwise) on the substrate as a green ceramic suspended in a solvent and binder. The binder is burned off by a slow thermal ramp to a temperature of at least 350 C in a mildly oxidizing atmosphere. The electrolyte is then lifted off the sacrificial substrate. The electrolyte fired at high temperature such as 1100° C. for at least 15 minutes. A porous garnet is deposited on one surface with a similar technique but a low-solids loading solution, and the sintering conditions of time, temperature, and atmosphere are controlled to avoid full densification. Optimally, the porosity is greater than 40% and is preferably greater than 60%. This porous layer is infiltrated by a conductive carbon from the vapor phase, such as in a pitch coating, CVD, ALD, techniques that are used to make carbon fibers, graphene, graphite, ketjen black, carbon nanotubes, commonly called CNTs, or otherwise. Next, the dual-layer film is placed on a lithium foil in a nitrogen-free, oxygen-free, water-free environment such as He or Ar gas. A current collector that does not alloy or react with lithium (such as Cu or Ni) foil is applied to the back of the Li anode and a mesh that does not react in air or dissolve or corrode at voltages greater than 3V such as stainless steel is applied to the cathode. Of course, there can be variations.

In an example, techniques have been employed to prepare a garnet powder and dense pellet, as follows:

Measure out each precursor powder (weigh out stoichiometric ratios of components, such as LiOH, La$_2$O$_3$, ZrO$_2$, and dopants e.g. Ta$_2$O$_5$, Al$_2$O$_3$, Nb$_2$O$_5$.

The powders are wet-mixed for 4-6 hrs on a roller mill, in a Nalgene bottle half filled with milling yttria stabilized zirconia (YSZ) media using 2-propanol as the liquid medium.

The mixed powders are transferred to a 90 C oven and dried until all the propanol has evaporated.

The dried precursor powders are transferred to an alumina crucible and calcined at 900 C for 6 hrs to form the garnet crystalline phase. To reduce the particle size of the newly formed garnet powder, it is transferred back into the Nalgene bottle with fresh YSZ milling media and 2-propanol and milled for a further 6-24 hrs.

Subsequently, the garnet powder can be dried as before.

To prepare pellets fro sintering, binder is added to the milled garnet powder. STo some garnet powder is added 2% wt of polyvinylpyrollidone (PVP). The PVP can be predissolved in 2-propanol to form a binder solution. The PVP solution and the garnet powder are mixed by hand in a beaker on a warm hotplate until the propanol has evaporated. Drying can be completed in a 120 C oven for a further 30 mins.

To prepare the pellet the garnet-PVP powder is crushed using a Mortar & pestle and passed through an 80 mesh seive. Approximately, 0.7 gms of this sieved powder is poured into a 13 mm die and pressed under 25 MPa. The pressed pellet in then heated to 1100° C. for 15 minutes during which time it sinters to high density, i.e. 85-100%.

In an example, techniques have been employed to prepare a porous garnet material as follows:

The garnet powder (as prepared as above) is initially dispersed in the organic solvent. 8 gms of garnet powder along 0.16 gms of a dispersant, Menhaden Blown Fish Oil and 5.1 gms of a solvent (toluene:ethanol mixture, 4:1) are transferred into a small plastic bottle (~30 ml), partially filled with YSZ milling media and mixed on a roller mill for 4-6 hrs.

To this dispersed garnet mixture is added 0.516 gms of a binder, poly-vinyl-butyral (PVB) and 0.516 gms of a plasticizer, Butyl Benzyl Phtalate and the slurry is rolled on the roller mill for a further 2 hrs.

To prepare a film from this slurry a metal foil (e.g. Copper or Nickel) is laid flat on a glass surface. A doctor blade, with Blade height set ~50 um, was used to cast the slurry which dries within a few minutes at room temperature to a dry thickness of 20 um. The garnet film on metal foil is then cut into desired sizes. The films are then heat treated in a similar manner to the pellet described above but require atmospheric control in order to avoid oxidation of the metal substrate.

First a binder removal heat treatment is carried out by a slow thermal ramp to ~600 C, in a tube furnace under a mildly oxidizing environment such as a wet argon flow of ~200 sccm. Then the films are sintered at temperature between 1000-1200 C for 15 ins-6 hrs under a wet-Argon-Hydrogen gas flow. The films are cooled to <250 C before they are removed to atmosphere. In practice a Lithium rich atmosphere is necessary to inhibit Li loss from the film and this can be achieved by covering the film with a powder of the same composition as the film.

Figure 11:
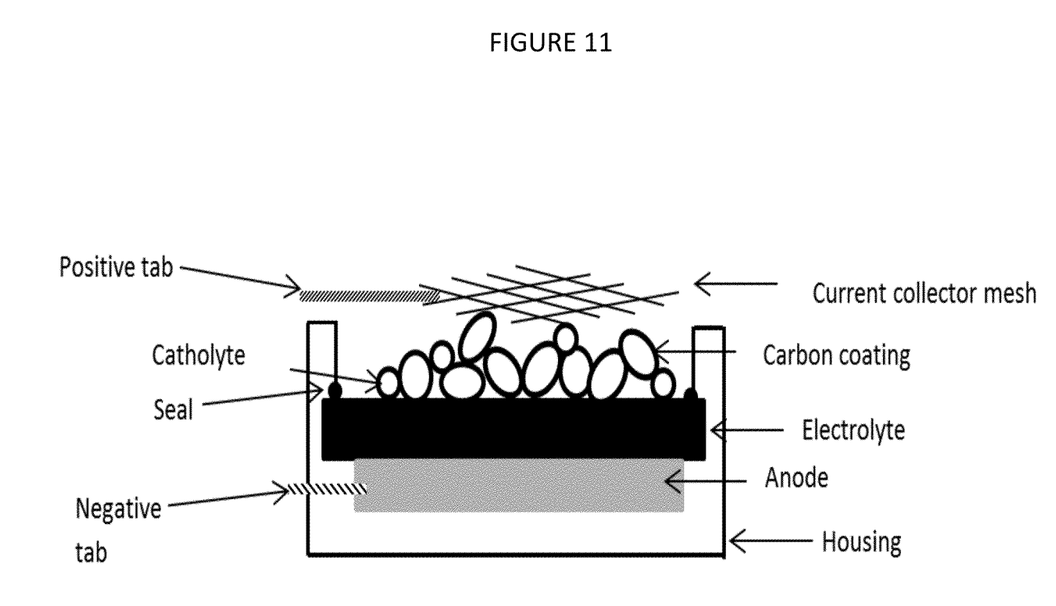
FIG. 11 is a simplified cross-sectional diagram of a lithium air battery device configured in a housing according to an example.

FIG. 11 is a simplified cross-sectional diagram of a lithium air battery device configured in a housing according to an example. As shown is a solid state battery device. The device has a current collector region. The device has a lithium containing anode member overlying the current collector region. In an example, the lithium containing anode member is a substantially solid material or variation thereof. The device has a thickness of electrolyte material comprising a first garnet material overlying the lithium containing anode member. In an example, the thickness of electrolyte material has a density ranging from about 80 percent to 100 percent. In an example, the electrolyte material has the first garnet material or the like. The first garnet material comprising La$_A$Li$_B$Zr$_C$O$_D$X$_E$ where 2<A<4, 4<B<8, 1<C<3, 10<D<14, 0≤E<2, and X is one or more elements selected from a list comprising Al, Sb, Ta, Nb, or Ba or variations.

In an example, the device has a porous cathode material comprising a second garnet material overlying the thickness of electrolyte material. In an example, the porous electrolyte material has a porosity of greater than about 30 percent and less than about 95 percent. In an example, the second garnet material comprises La$_A$Li$_B$Zr$_C$O$_D$X$_E$ where 2<A<4, 4<B<8, 1<C<3, 10<D<14, 0≤E<2, and X is one or more elements selected from a list comprising Al, Sb, Ta, Nb, or Ba. In an example, the thickness of the electrolyte material ranges from about 2 microns to about 30 microns. In the device has a carbon bearing material overlying a surface region of the porous cathode material. In an example, the carbon bearing material comprises substantially carbon material or variations thereof.

In an example, the device has an oxygen bearing source in contact with a surface region of the porous cathode material. The oxygen bearing source is commonly air or other gas material. In an example, the device has a current collector structure configured to expose the surface region to the oxygen bearing source, and having a conductivity in a predetermined amount.

In an example as shown, the current collector structure comprising a mesh structure configured in a metal material. In an example, the metal material is a stainless steel or nickel material. As shown, the mesh structure is configured to allow the oxygen to come in intimate contact with the surface of the porous cathode material while maintaining the porous cathode material within a predefined spatial region between the mesh structure and the thickness of electrolyte material.

As also shown, the device has a covering enclosing the electrolyte material in a spatial region within a hermetic sealed region. In an example the covering is a pouch comprising a laminated polymer and metal structure. In an example, each of the edges is sealed to an upper region of the electrolyte material, although there can be variations. As shown is a negative member or tab connected to the anode member. Also shown is a positive member or tab connect to the current collector mesh to complete the battery cell structure.

Figure 12:
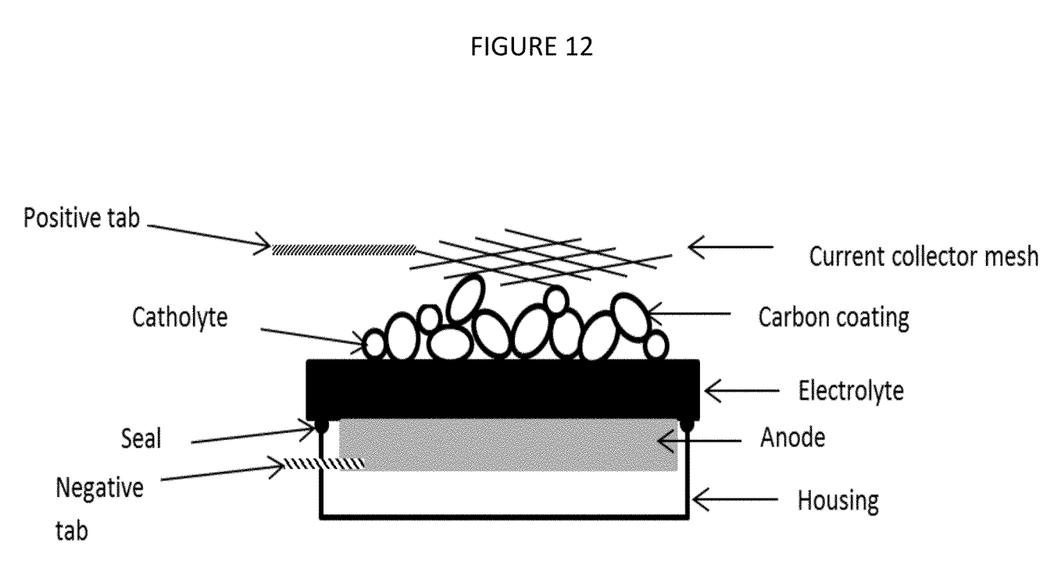
FIG. 12 is a simplified cross-sectional diagram of a lithium air battery device configured in a housing according to another example.

FIG. 12 is a simplified cross-sectional diagram of a lithium air battery device configured in a housing according to another example. As shown is a solid state battery device. The device has a current collector region. The device has a lithium containing anode member overlying the current collector region. In an example, the lithium containing anode member is a substantially solid material or variation thereof. The device has a thickness of electrolyte material comprising a first garnet material overlying the lithium containing anode member. In an example, the thickness of electrolyte material has a density ranging from about 80 percent to 100 percent. In an example, the electrolyte material has the first garnet material or the like. The first garnet material comprising La$_A$Li$_B$Zr$_C$O$_D$X$_E$ where 2<A<4, 4<B<8, 1<C<3, 10<D<14, 0≤E<2, and X is one or more elements selected from a list comprising Al, Sb, Ta, Nb, or Ba or variations.

In an example, the device has a porous cathode material comprising a second garnet material overlying the thickness of electrolyte material. In an example, the porous electrolyte material has a porosity of greater than about 30 percent and less than about 95 percent. In an example, the second garnet material comprises $La_A Li_B Zr_C O_D X_E$ where $2<A<4$, $4<B<8$, $1<C<3$, $10<D<14$, $0 \leq E<2$, and X is one or more elements selected from a list comprising Al, Sb, Ta, Nb, or Ba. In an example, the thickness of the electrolyte material ranges from about 2 microns to about 30 microns. In the device has a carbon bearing material overlying a surface region of the porous cathode material. In an example, the carbon bearing material comprises substantially carbon material or variations thereof.

In an example, the device has an oxygen bearing source in contact with a surface region of the porous cathode material. The oxygen bearing source is commonly air or other gas material. In an example, the device has a current collector structure configured to expose the surface region to the oxygen bearing source, and having a conductivity in a predetermined amount.

In an example as shown, the current collector structure comprising a mesh structure configured in a metal material. In an example, the metal material is a stainless steel or nickel material. As shown, the mesh structure is configured to allow the oxygen to come in intimate contact with the surface of the porous cathode material while maintaining the porous cathode material within a predefined spatial region between the mesh structure and the thickness of electrolyte material.

As also shown, the device has a covering enclosing the electrolyte material in a spatial region within a hermetic sealed region. In an example the covering is a pouch comprising a laminated polymer and metal structure. In an example, each of the edges is sealed to a lower region of the electrolyte material, although there can be variations. Alternatively, the seal can be at an edge region or some combination of the above, while there are variations. As shown is a negative member or tab connected to the anode member. Also shown is a positive member or tab connect to the current collector mesh to complete the battery cell structure.

In an example, the present method and structure can lead to advantages. In an example, the present method and resulting battery device can achieve longer lifetime, higher power density, and higher energy density compared to other Li-air batteries. In an example, the present battery device also achieves higher energy density compared to other batteries. Of course, there can be variations, modifications, and alternatives.

Although numerous examples of the invention have been illustrated and described, the invention is not so limited. Numerous modifications, variations, substitutions and equivalents will occur to those skilled in the art without departing from the spirit and scope of the present invention.

While the above is a full description of the specific embodiments, various modifications, alternative constructions and equivalents may be used. That is, the above description can be applied to other elements such as an electrolyte or others. Therefore, the above description and illustrations should not be taken as limiting the scope of the present invention which is defined by the appended claims.

The invention claimed is:

1. A solid state battery device, the battery device comprising:
    a current collector region;
    a lithium containing anode member overlying the current collector region;
    an electrolyte material comprising a first garnet material overlying the lithium containing anode member, the electrolyte material having a density ranging from about 80 percent to 100 percent of a theoretical density associated with the first garnet material, the first garnet material comprising $La_A Li_B Zr_C O_D X_E$ where $2<A<4$, $4<B<8$, $1<C<3$, $10<D<14$, $0<E<2$, and where X is one or more elements selected from the group consisting of Al, Sb, Ta, Nb, and Ba;
    a porous cathode material consisting essentially of a second garnet material overlying the electrolyte material, the porous cathode material having a porosity of greater than about 30 percent and less than about 95 percent, the second garnet material being $La_A Li_B Zr_C O_D X_E$ where $2<A<4$, $4<B<8$, $1<C<3$, $10<D<14$, $0<E<2$, and where X is one or more elements selected from the group consisting of Al, Sb, Ta, Nb, and Ba;
    a carbon bearing material overlying a surface region of the porous cathode material, the carbon bearing material comprising substantially carbon material;
    an oxygen bearing source in contact with the surface region of the porous cathode material; and
    a current collector structure configured to expose the surface region to the oxygen bearing source, and having a conductivity in a predetermined amount.

2. The device of claim 1 wherein the electrolyte material is characterized by a thickness of about 2-30 microns, wherein the current collector structure comprises a mesh structure configured in a metal material, the metal material being a stainless steel or nickel material, and the mesh structure being configured to allow oxygen from the oxygen bearing source to come in intimate contact with the surface of the porous cathode material while maintaining the porous cathode material within a predefined spatial region between the mesh structure and the electrolyte material, and wherein the device further comprises a covering enclosing the electrolyte material in a spatial region within a hermetic sealed region, the covering being a pouch comprising a laminated polymer and metal structure.

3. The device of claim 1 wherein the porous cathode material is configured as a percolating structure.

4. The device of claim 1 wherein the porous cathode material is characterized by a thickness of about 1-100 microns.

5. The device of claim 1, the oxygen bearing source being air or other oxygen environment.

6. The device of claim 1 wherein the porous cathode material is in the form of a plurality of interconnected particles, and wherein the porous cathode material is prepared by a process comprising the steps of:
    thermally treating the plurality of particles disposed overlying the electrolyte material; and
    decomposing a binder material disposed along with the plurality of particles.

7. The device of claim 1 wherein the porous cathode material is in the form of a plurality of particles interconnected via a necking process.

8. The device of claim 1 wherein the electrolyte material is provided by a plurality of particles disposed overlying the anode material.

9. The device of claim 1 wherein the electrolyte material is characterized by a polycrystalline structure.

10. The device of claim 1 wherein the electrolyte material is configured to maintain a surface region of the lithium containing anode material to be free from a formation of a dendrite structure.

11. The device of claim 1 wherein the current collector region comprises a negative electrode characteristic, and wherein the current collector region further comprises Cu, Ni, stainless steel and/or W, or materials coated with Cu, Ni, stainless steel, and/or W.

* * * * *